Jan. 3, 1933. A. DUBONNET 1,892,937
SUSPENSION FOR VEHICLES
Filed Dec. 20, 1929 2 Sheets-Sheet 1
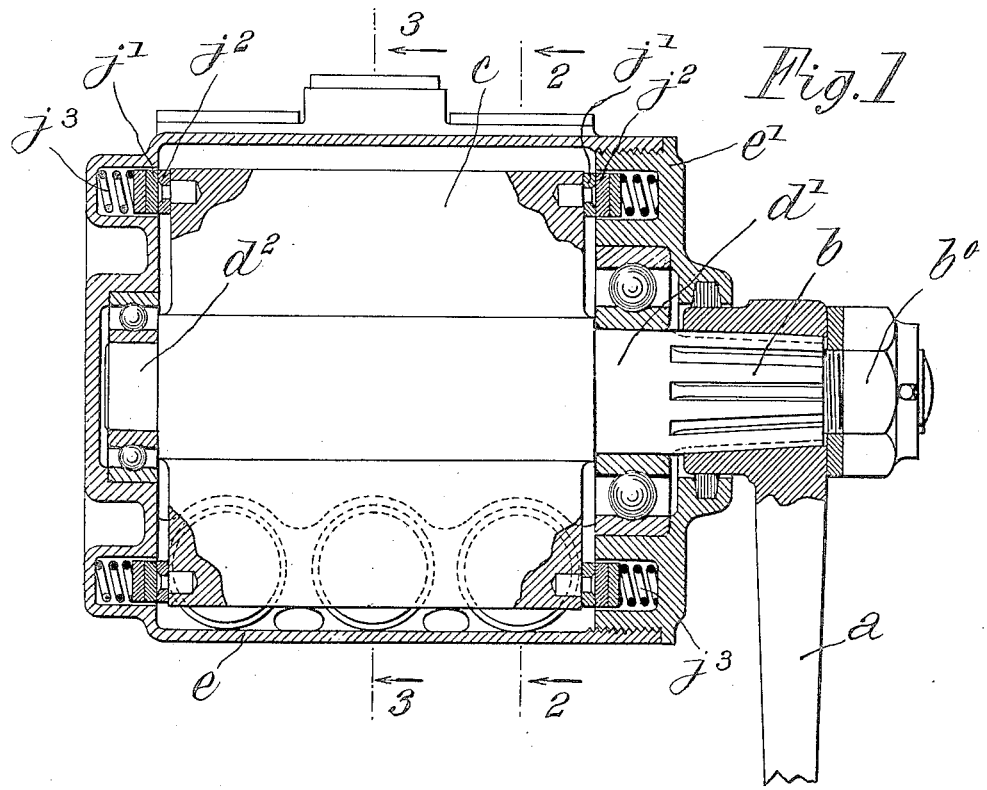
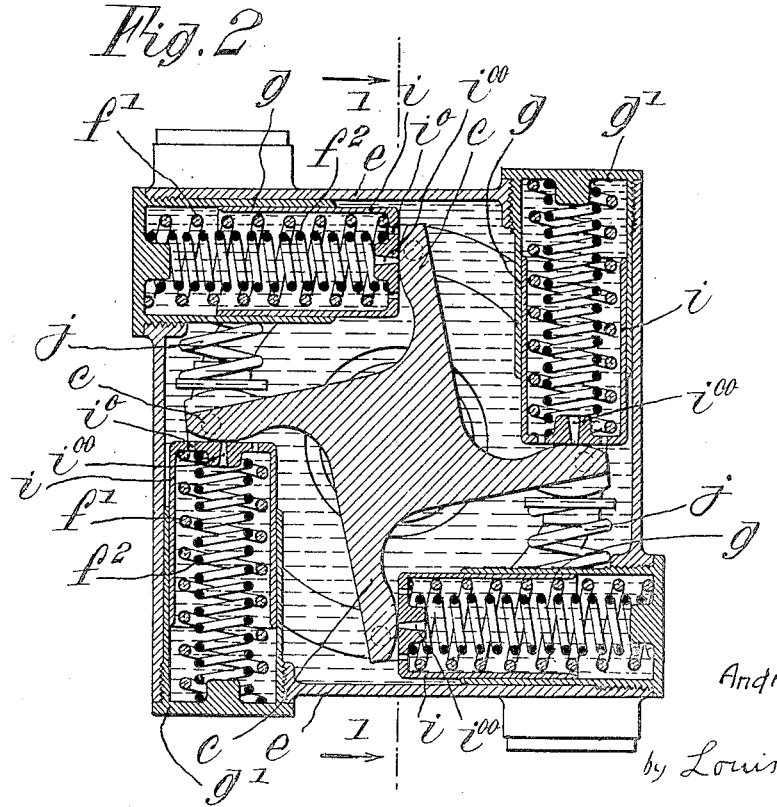
Andre Dubonnet
Inventor.
by Louis Barnett
Attorney.

Jan. 3, 1933.  A. DUBONNET  1,892,937
SUSPENSION FOR VEHICLES
Filed Dec. 20, 1929   2 Sheets-Sheet 2

Patented Jan. 3, 1933

1,892,937

UNITED STATES PATENT OFFICE

ANDRÉ DUBONNET, OF NEUILLY SUR SEINE, FRANCE

SUSPENSION FOR VEHICLES  REISSUED

Application filed December 20, 1929, Serial No. 415,510, and in Belgium October 23, 1929.

The present invention relates to suspensions for vehicles.

One of the objects of the invention is to provide means for suspending each of the wheels of a vehicle independently.

Another object is to provide shock-absorbing means adapted to react independently on each wheel.

Further objects will appear in the course of the detailed description now to be given with reference to the accompanying drawings, in which:—

Fig. 1 is a partial section taken on line 1—1 of Fig. 2 and representing one illustrative embodiment of the invention.

Fig. 2 is a section taken on line 2—2 of Fig. 1;

Referring to the various figures of the drawings, there is shown a plurality of wheels rotatably mounted on the free end of oscillatable arms $a$,—tapered shaft $b$ having recesses formed therein adapted to engage with corresponding elongated "keys" formed integral with arms $a$, elements $a$ and $b$ being maintained in assembled relation by a suitable nut and cotter-pin assembly $b^o$ engaging with shaft $b$,—a plurality of arms $c$ formed integral with, or rigidly attached to, shaft $b$,—ball-bearings are placed at $d^1$, $d^2$ supporting elements $b$ and $c$,—and a shock-absorbing assembly enclosed in threadedly engaging casing elements $e$ and $e^1$ and consisting of a plurality of springs $f^1$, $f^2$ reacting at opposite extremities (1) on a cylinder $g$ threadedly engaging with casing $e$ and (2) on a hollow piston $i$, the end-portion $i^1$ of elements $i$ being provided with conical orifices $i^{oo}$ adapted to offer a greater resistance to the exit than to the entry of lubricating fluid into the chambers limited externally by assemblies $g$, $i$, resilient reacting assemblies composed of springs $j$, head-elements $h$ and end-plugs $g^2$ serving to maintain arms $c$ in contact with ends $i^1$ of pistons $i$, frictional assemblies for reducing the amplitude of rotation of arms $c$ comprising buttons $j^1$ secured to the latter and frictionally engaging with arcuate elements $j^2$ held in contact with buttons $j^1$ by springs $j^3$, and a lubricating fluid—oil or the like-filling the free space inside casing assembly $e$, $e^1$.

Figure 3:
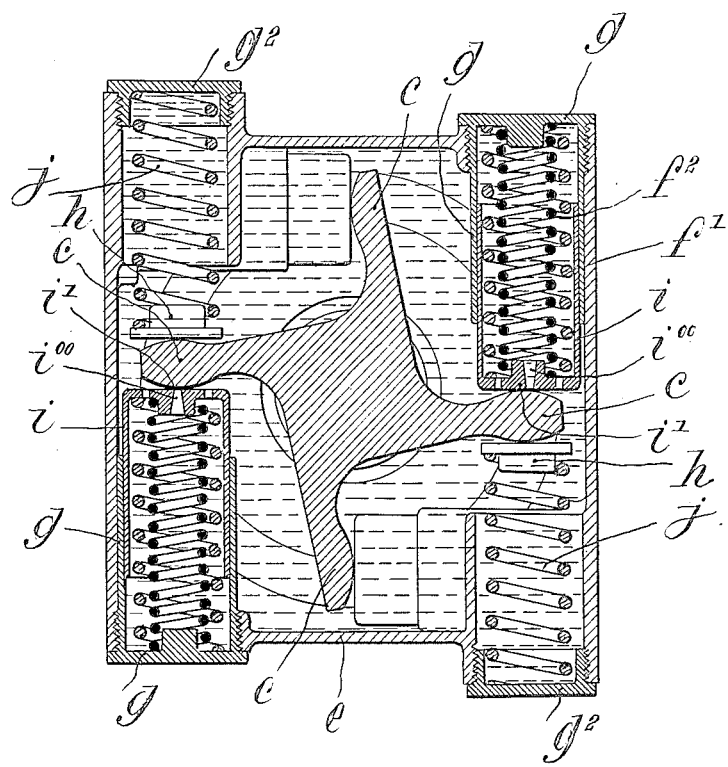
Fig. 3 is a section passing through line 3—3 of Fig. 1.
Figure 4:
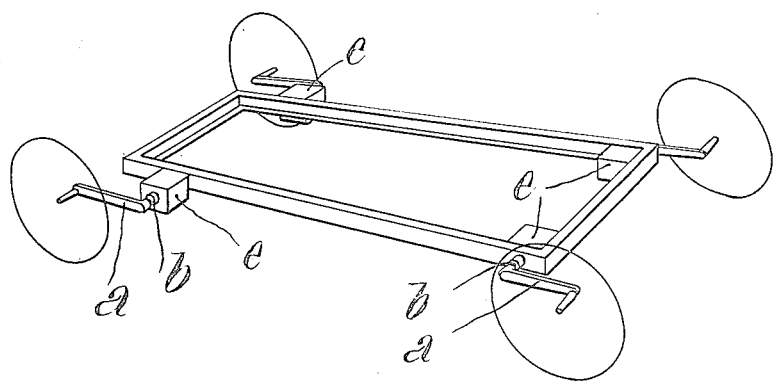
Fig. 4 is a diagrammatic perspective of an assembled chassis and wheels.

As shown in Figs. 2 and 3, the orifices $i^{oo}$ in the heads of the hollow pistons $i$ are conical, each being tapered to provide an inwardly flared passage of gradually increasing section. The lubricating fluid in passing through said passages $i^{oo}$ into the cylinder $g$ and pistons $i$ encounters a greater resistance when flowing in the direction in which the section increases, that is, in the direction corresponding to the outward movement of the pistons $i$, than when passing in the opposite direction corresponding to the inward movement of the pistons $i$.

The manner in which the device operates is practically self-evident from the description. Shocks transmitted to any wheel will result in rotation of corresponding arm $a$ about shaft $b$ as an axis, arms $c$ attached to the latter shaft react then on elements $i$ of dash-pots $i$, $g^1$ to compress springs $f^1$, $f^2$ and force lubricating fluid outward through conical orifices $i^{oo}$, elements $j^1$, $j^2$ functioning to oppose, frictionally, large angular displacements of said arms. Springs $j^3$, frictionally engaging elements $j^1$, $j^2$ and the fluid passing through conical orifices $i^{oo}$ cooperate to bring arms $c$ back to equilibrium position without violence when springs $f^1$, $f^2$ force pistons $i$ outward.

Casings $e$ may be detachably mounted on the vehicle chassis and may be connected to a conduit providing a supply of oil under pressure (not shown), if desired. It will be noted that, by unscrewing nut $b^o$ and removing arm $c$ and end element $e^1$, the entire contents of casing $e$ becomes accessible. The magnitude of the compression on springs $f^1$, $f^2$ and $j$ may be varied by rotation of elements $g^1$ and $g^2$ and these springs may be removed for repair by the same operation without detaching elements $e$ and $e^1$. Arms $c$ are not mounted radially to diminish any possibility of bending or breakage and are, preferably even in number.

Obviously, the invention is not to be taken as limited to the particular structures described but may be modified in various ways, which will be obvious to those skilled in the art thus: assemblies $j$, $h$, $g^2$ may be replaced by those of the type $g^1$, $i$, $f^1$, $f^2$ or conversely; frictional assembly $j^1$, $j^2$ may be used alone without the adjunction of the resilient structures reacting on arms $c$ or conversely; the shock absorbing assembly inside casing $e$, $e^1$ may be attached to other oscillating structures of the nature of arm $a$; etc., etc.

What I claim is:—

1. In a vehicle provided with a wheel, a chassis, and a wheel supporting element oscillatably supported at one extremity on said chassis and carrying said wheel at its free extremity, means for diminishing the amplitude of oscillation of said wheel supporting element comprising an arm mounted to rotate about the axis of oscillation of the wheel supporting element and to react on the latter, and a dash-pot bearing against said arm and including a pair of hollow telescoping elements, one of said telescoping elements having a passage of gradually increasing section formed therethrough, whereby a fluid moving through said passage encounters a greater resistance when flowing in one direction than in the direction opposite.

2. A structure as defined in claim 1 in combination with means operative to frictionally oppose angular displacement of said arm.

3. In a vehicle provided with a wheel, a chassis, and a wheel supporting element oscillatably supported at one extremity on said chassis and carrying said wheel at its free extremity, means for diminishing the amplitude of oscillation of said wheel supporting element comprising a plurality of arms mounted to rotate about the axis of oscillation of the wheel supporting element and to react on the latter, and a pair of dash-pots mounted at angles to one another and bearing against said arms, each of said dash-pots including a pair of telescoping elements, one of said telescoping elements having a passage formed through the wall thereof adapted to offer resistance to the passage of a fluid thereto, in combination with springs mounted inside said dash-pots and tending to force said telescoping elements apart, and a spring reacting laterally on one of said dash-pots and bearing against one of said arms at its other extremity.

4. In a vehicle provided with a wheel, a chassis, and a wheel supporting element oscillatably supported at one extremity on said chassis and carrying said wheel at its free extremity, means for diminishing the amplitude of oscillation of said wheel supporting element comprising four arms mounted to rotate about the axis of the wheel supporting element and to react on the latter, four dash-pots mounted at right angles to one another and bearing against said arms, each of said dash-pots including a pair of telescoping elements, one of each pair of said telescoping elements having a passage formed through the wall thereof adapted to offer resistance to the flow of a fluid therethrough, a spring positioned inside each of said dash-pots and tending to force each pair of telescoping elements apart and springs interposed between said arms and the lateral walls of said dash-pots, said last named springs opposing extension of said dash-pots.

In testimony whereof, I affix my signature.

ANDRÉ DUBONNET.